(No Model.)

W. H. HART.
PIPE COUPLING.

No. 432,733. Patented July 22, 1890.

Attest.
Sidney P. Hollingsworth
Thomas J. Kelley

Inventor
William H. Hart
by his attorneys
Baldwin, Davidson & Wight

THE NORRIS PETERS CO., PHOTO-LITHO., WASHINGTON, D. C.

UNITED STATES PATENT OFFICE.

WILLIAM H. HART, OF BROOKLYN, NEW YORK.

PIPE-COUPLING.

SPECIFICATION forming part of Letters Patent No. 432,733, dated July 22, 1890.

Application filed February 17, 1890. Serial No. 340,713. (No model.)

*To all whom it may concern:*

Be it known that I, WILLIAM H. HART, of Brooklyn, in the county of Kings and State of New York, have invented certain new and useful Improvements in Pipe-Couplings, of which the following is a specification.

The object of my invention is to provide pipe-couplings that may be produced with little or no increase of cost over the ordinary pipe-couplings now in use, and which shall be so constructed as to offer great facility in coupling and a large saving in labor; and the invention consists in a specific improvement upon that class of couplings in which the diameter of the coupling exceeds that of the body of the pipe and in which the bore of the pipe is not contracted at the coupling. With such ordinary couplings it is difficult under the most favorable circumstances to present the threads of the coupling and the end of the pipe in proper relation to each other so as to insure the ready entrance of one thread into the other. This is more especially true in handling heavy pipes, and also where the work has to be done in contracted places—as, for enstance, in the laying of pipes in underground conduits. I have found by the use of my invention in pipes for this latter purpose that I am enabled to save fifty per cent., or thereabout, in the labor of connecting pipes—that is to say, a gang of workmen will couple twice as much pipe equipped with my improvements as they can of the ordinary pipe.

Figure 1:
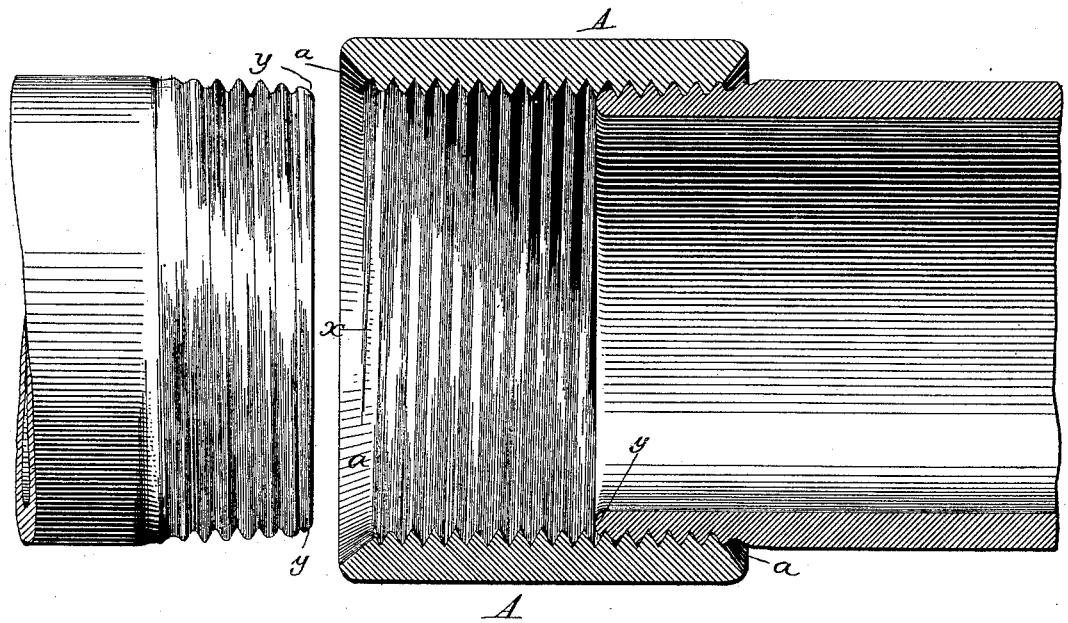
Figure 2:
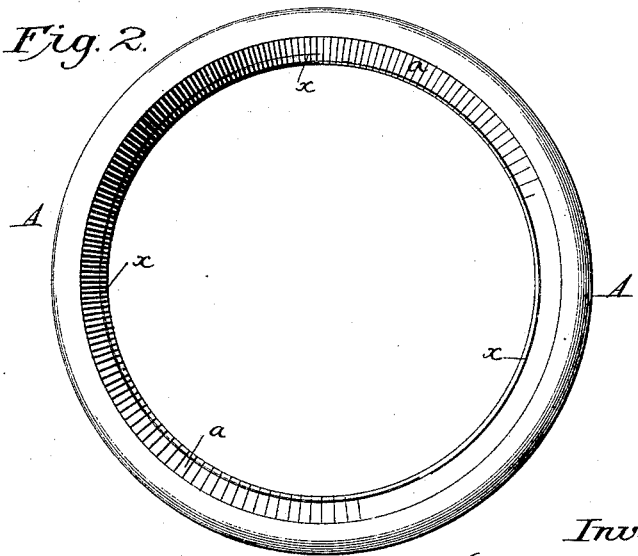

In the accompanying drawings illustrating my improvements, Figure 1 is a longitudinal section through a coupling and one end of a pipe entered therein, the end of another pipe about to be entered being shown in elevation. Fig. 2 is an end elevation, looking into the coupling.

As is common in pipe-couplings, I have shown the straight-bore coupling A with a thread deepest at the middle of the coupling and shallowing or vanishing toward its ends, the threaded ends of the pipes, whose bore is is also straight or of unvarying diameter, being correspondingly tapered. Most pipe and couplings are now made in this manner, and of course this forms no features of my invention.

I bevel the interior edge of each end of the coupling, as indicated at *a*, and, as is plain from the drawings, the thread tapped therein runs out into the face of the bevel, as indicated at *x*. The bevel, however, as is obvious, does not fit close against the exterior face of the pipe, since the face of the pipe is straight. If I bevel the coupling before threading it, then the tool or tap which is run into the coupling to cut the thread would of necessity, to an extent depending upon the inclination of the bevel, cut also into the surface of the bevel; or if I first thread the coupling and then ream it out to form the bevel a part of the screw-threading would similarly be left in the beveled face, its depth and extent depending upon the inclination of the bevel. With such a coupling, when the threaded end of a pipe is entered, the bevel *a* centers the pipe and directs it accurately to the thread, and as the thread also runs out into the beveled face an immediate engagement of the two threads is insured.

By preference I round the end of the pipe, as indicated at *y*. The purpose in doing this is to facilitate the entrance of the pipe and assist the bevel in centering it. Another purpose is that when the end is rounded there is less liability of the feather or thread at the extreme end of the pipe being bruised or broken down in handling and shipping the pipe. The beveling of the coupling also affords protection to the end of the thread cut therein.

I am aware that heretofore it has been proposed to countersink the ends of a coupling and to cut the thread on the smaller diameter left within the coupling. This is a construction which has been adopted in pipes designed for oil-pipe lines, which are sometimes elevated above the earth, the purpose being to relieve the pipe of transverse strain on its screw-threaded portion. I am also aware that it has been proposed to leave chambers at the ends of the coupling for the reception of packing or calking material. I am also aware that it has been proposed to contract the ends of the pipe and have the bore of the coupling similarly contracted, or of smaller diameter at its middle, the curve of contraction in the bore of the coupling corresponding with the curve of contraction of the end of the pipe, and in such a construction to cut the thread in the coupling so as to leave an uncut portion at each end. The purpose of such an arrangement is to have the exterior diameter of the coupling equal to that of the body of the pipe. I do not therefore claim either of such constructions as within my invention.

My invention contemplates the beveling of the inner edges of the coupling and having the screw-thread start immediately from and in the beveled surfaces.

When I speak of the coupling having a straight bore, I mean to distinguish it from such a coupling as is shown in the patent of Patterson, No. 243,608, dated June 28, 1881, and not to exclude the use of a common vanishing thread such as above referred to. In Patterson's construction the bore of the coupling is contracted at the center, and the ends of the pipes are also contracted. The diameter of the bore or duct is therefore reduced at the coupling and a uniform exterior diameter of pipes and coupling obtained. My arrangement is different from this in that the core of the pipe is not reduced and the exterior diameter of the coupling is larger than that of the pipe, and I limit myself to my specific construction and the specific differences resulting therefrom.

I claim as my invention—

A solid pipe-coupling having its inner edge at each end beveled, as at $a$, and a straight bore screw-threaded from end to end, the thread at each end running out into or being cut into the bevel $a$, in combination with uncontracted or straight-bore pipes threaded at their ends and adapted to be screwed into said coupling.

In testimony whereof I have hereunto subscribed my name.

WILLIAM H. HART.

Witnesses:
EDWARD C. DAVIDSON,
MAMIE J. KELLEY.